United States Patent
Vasquez et al.

(10) Patent No.: US 11,452,365 B2
(45) Date of Patent: Sep. 27, 2022

(54) GRIP DEVICE TO ENABLE A NUMBER OF OPERATIONS ASSOCIATED WITH A PORTABLE ELECTRONIC DEVICE BASED ON ATTACHMENT THERETO

(71) Applicants: Robert Vasquez, Gilbert, AZ (US); Yanbei Qin, Zhejiang (CN)

(72) Inventors: Robert Vasquez, Gilbert, AZ (US); Yanbei Qin, Zhejiang (CN)

(73) Assignee: SHAWSHANK LEDZ INC., Gilbert, AZ (US)

( * ) Notice: Subject to any disclaimer, the term of this patent is extended or adjusted under 35 U.S.C. 154(b) by 367 days.

(21) Appl. No.: 16/691,636

(22) Filed: Nov. 22, 2019

(65) Prior Publication Data

US 2021/0153635 A1 May 27, 2021

(51) Int. Cl.
*A45F 5/10* (2006.01)
*H04B 1/3827* (2015.01)
*H04B 1/3888* (2015.01)

(52) U.S. Cl.
CPC .......... *A45F 5/10* (2013.01); *H04B 1/385* (2013.01); *A45F 2200/0516* (2013.01); *A45F 2200/0525* (2013.01); *H04B 1/3888* (2013.01); *H04B 2001/3861* (2013.01)

(58) Field of Classification Search
CPC .......... A45F 5/10; A45F 2200/0516; A45F 2200/0525; H04B 1/3888; H04B 2001/3861; H04M 1/0281
See application file for complete search history.

(56) References Cited

U.S. PATENT DOCUMENTS

| | | | |
|---|---|---|---|
| 5,664,292 A * | 9/1997 | Chen | A45F 5/02 24/3.11 |
| 6,352,186 B1 * | 3/2002 | Endo | H04B 1/385 224/254 |
| 8,374,657 B2 | 2/2013 | Interdonato | |
| 8,380,264 B2 | 2/2013 | Hung et al. | |
| 8,428,664 B1 | 4/2013 | Wyers | |
| 8,550,317 B2 | 10/2013 | Hyseni | |
| 8,560,031 B2 | 10/2013 | Barnett et al. | |

(Continued)

FOREIGN PATENT DOCUMENTS

DE  202018005699 U1  1/2019
KR  101390427 B1  4/2014

(Continued)

OTHER PUBLICATIONS

"SlideVue" by BodyGuardz, Found Online on [Sep. 17, 2019] https://www.bodyguardz.com/slidevue.html.

(Continued)

*Primary Examiner* — Dean J Kramer
(74) *Attorney, Agent, or Firm* — LegalForce RAPC Worldwide

(57) ABSTRACT

A method includes providing a main frame configured to be attached to a surface associated with a portable electronic device, and providing a flexible strap. The method also includes forming a grip device based on receiving slide elements of the flexible strap through a channel of the main frame, and enabling operations associated with the portable electronic device and support thereof on a flat surface through the attachment of the formed grip device to the portable electronic device.

20 Claims, 11 Drawing Sheets

(56) References Cited

U.S. PATENT DOCUMENTS

| | | | |
|---|---|---|---|
| 8,567,832 B2 | 10/2013 | Kannaka | |
| 8,740,270 B1 | 6/2014 | Mizell et al. | |
| 8,939,483 B2 | 1/2015 | Kim | |
| 8,973,795 B2 | 3/2015 | Chiu, Jr. et al. | |
| 9,010,595 B2 | 4/2015 | Yu | |
| 9,027,808 B2 | 5/2015 | Kim | |
| 9,074,725 B2 | 7/2015 | Trotsky | |
| 9,075,569 B1* | 7/2015 | Hansen | G06F 1/3206 |
| 9,259,077 B2* | 2/2016 | Murphy | F16M 13/00 |
| 9,267,642 B2 | 2/2016 | Enkerlin et al. | |
| 9,316,344 B2 | 4/2016 | Le Gette et al. | |
| 9,397,717 B2 | 7/2016 | Curran | |
| 9,407,743 B1* | 8/2016 | Hirshberg | F16M 13/022 |
| 9,671,064 B2 | 6/2017 | Tussy | |
| 9,979,428 B2 | 5/2018 | Tomobe et al. | |
| 10,001,243 B2 | 6/2018 | Cavalcante | |
| 10,237,383 B2 | 3/2019 | Park | |
| 10,298,730 B2 | 5/2019 | Brown | |
| 10,396,841 B2* | 8/2019 | Nielsen | A45F 5/10 |
| 10,463,126 B2* | 11/2019 | Mallory | A45F 5/00 |
| 2004/0113036 A1 | 6/2004 | Gilbert | |
| 2005/0205623 A1 | 9/2005 | Buntain | |
| 2010/0072334 A1 | 3/2010 | Le Gette et al. | |
| 2011/0266316 A1 | 11/2011 | Ghalib et al. | |
| 2011/0267748 A1 | 11/2011 | Lane | |
| 2011/0279959 A1 | 11/2011 | Lopez | |
| 2011/0299231 A1 | 12/2011 | Gaddis, II et al. | |
| 2012/0042476 A1 | 2/2012 | Karmatz | |
| 2012/0068043 A1 | 3/2012 | Daigle et al. | |
| 2012/0111881 A1 | 5/2012 | Gaddis, II et al. | |
| 2012/0113572 A1 | 5/2012 | Gaddis, II et al. | |
| 2012/0187706 A1 | 7/2012 | Kannaka | |
| 2012/0275094 A1 | 11/2012 | Zhou et al. | |
| 2013/0119099 A1 | 5/2013 | Interdonato | |
| 2013/0140312 A1 | 6/2013 | Lane et al. | |
| 2013/0146625 A1 | 6/2013 | Karle et al. | |
| 2014/0166706 A1 | 6/2014 | Leisey-Bartsch | |
| 2014/0364176 A1 | 12/2014 | Pintor | |
| 2015/0009610 A1 | 1/2015 | London et al. | |
| 2016/0088924 A1 | 3/2016 | Haymond et al. | |
| 2018/0048342 A1 | 2/2018 | Curcio | |
| 2018/0069580 A1* | 3/2018 | Harris-Johnson | H04B 1/385 |

FOREIGN PATENT DOCUMENTS

| | | | |
|---|---|---|---|
| KR | 20140136598 A | 12/2014 | |
| KR | 101494104 B1 * | 2/2015 | |
| KR | 101616697 B1 | 4/2016 | |
| KR | 101629434 B1 | 6/2016 | |
| KR | 101705820 B1 | 2/2017 | |
| WO | 2010030663 A2 | 3/2010 | |
| WO | 2011017686 A1 | 2/2011 | |
| WO | 2011139823 A2 | 11/2011 | |
| WO | 2012012588 A1 | 1/2012 | |
| WO | 2012019105 A2 | 2/2012 | |
| WO | 2012087371 A1 | 6/2012 | |
| WO | 2012125690 A1 | 9/2012 | |
| WO | 2012153943 A2 | 11/2012 | |
| WO | 2013009524 A2 | 1/2013 | |
| WO | 2016019256 A1 | 2/2016 | |
| WO | 2017069471 A1 | 4/2017 | |

OTHER PUBLICATIONS

"MOMOSTICK: Stand and Finger Grip for Any Smartphones" by MOMODIZ, Found Online on [Sep. 17, 2019] https://www.amazon.com/Original-MOMOSTICK-Smartphones-Android-Reusable/dp/B071LM5QT7?th=1#HLCXComparisonWidget_feature_div.

* cited by examiner

GRIP DEVICE TO ENABLE A NUMBER OF OPERATIONS ASSOCIATED WITH A PORTABLE ELECTRONIC DEVICE BASED ON ATTACHMENT THERETO

FIELD OF TECHNOLOGY

This disclosure relates generally to portable electronic device accessories and, more particularly, to a method, a device and/or a system of a grip device to enable a number of operations associated with a portable electronic device based on attachment thereto.

BACKGROUND

A portable electronic device such as a mobile phone, a tablet and a smart media player may be held in one hand of a user based on compactness thereof. However, ease of use of features available through the portable electronic device may still depend on design thereof and dexterity of fingers of the one hand of the user. Carelessness (e.g., placing a mobile phone on a wet surface, dropping the mobile phone) on part of the user may lead to damage of the portable electronic device.

In the case of the portable electronic device being a mobile phone, the mobile phone may be equipped with a case for damage protection purposes. The case may include an anchoring mechanism based on a clip, a grip base and/or an elastic strap. In the case of the elastic strap being the anchoring mechanism, the user may insert a hand or one or more fingers of the hand thereof into the elastic strap to securely hold the mobile phone. However, the elastic strap may enable the user to hold the mobile phone solely in a particular orientation, thereby limiting convenience thereof.

SUMMARY

Disclosed are a method, a device and/or a system of a grip device to enable a number of operations associated with a portable electronic device based on attachment thereto.

In one aspect, a grip device includes a main frame configured to be attached to a surface associated with a portable electronic device via a first surface thereof, and a flexible strap including a first slide element and a second slide element proximate a first end and a second end thereof respectively. The main frame includes a channel across a second surface thereof. The first slide element and the second slide element are configured to be received through the channel to enable movable attachment of the flexible strap to the main frame via the channel in accordance with sliding movement of the first slide element and the second slide element relative to one another across the channel based on a force applied to the flexible strap by a user of the grip device.

The sliding movement enables the first slide element and the second slide element to both be aligned along a first direction whereby insertion of a finger of the user through a first loop formed by the flexible strap following the alignment along the first direction enables a first operation associated with the portable electronic device in a portrait orientation thereof through one or more other finger(s) of the user when the grip device is attached to the surface associated with the portable electronic device. The sliding movement also enables the first slide element and the second slide element to both be aligned along a second direction perpendicular to the first direction whereby insertion of the finger of the user through a second loop formed by the flexible strap following the alignment along the second direction enables a second operation associated with the portable electronic device in a landscape orientation thereof through the one or more other finger(s) of the user when the grip device is attached to the surface associated with the portable electronic device.

Further, the sliding movement enables, based on alignment of both the first slide element and the second slide element along a third direction also capable of being the first direction and the second direction and the attachment of the grip device to the surface associated with the portable electronic device, the portable electronic device to be supported on a flat surface by a third loop also capable of being the corresponding first loop and the corresponding second loop by way of a portion of the third loop contacting the flat surface.

In another aspect, a method includes providing a main frame configured to be attached to a surface associated with a portable electronic device via a first surface thereof, and providing a flexible strap including a first slide element and a second slide element proximate a first end and a second end thereof respectively. The main frame includes a channel across a second surface thereof. The method also includes forming a grip device based on receiving the first slide element and the second slide element through the channel to enable movable attachment of the flexible strap to the main frame via the channel in accordance with sliding movement of the first slide element and the second slide element relative to one another across the channel based on a force applied to the flexible strap by a user of the grip device.

Based on the sliding movement of the first slide element and the second slide element of the flexible strap relative to one another across the channel, the method also includes enabling, through the grip device, the first slide element and the second slide element to both be aligned along a first direction whereby insertion of a finger of the user through a first loop formed by the flexible strap following the alignment along the first direction enables a first operation associated with the portable electronic device in a portrait orientation thereof through one or more other finger(s) of the user when the grip device is attached to the surface associated with the portable electronic device, and the first slide element and the second slide element to both be aligned along a second direction perpendicular to the first direction whereby insertion of the finger of the user through a second loop formed by the flexible strap following the alignment along the second direction enables a second operation associated with the portable electronic device in a landscape orientation thereof through the one or more other finger(s) of the user when the grip device is attached to the surface associated with the portable electronic device.

Based on the sliding movement of the first slide element and the second slide element of the flexible strap relative to one another across the channel, and based on alignment of both the first slide element and the second slide element along a third direction also capable of being the first direction and the second direction and the attachment of the grip device to the surface associated with the portable electronic device, the method further includes enabling, through the grip device, the portable electronic device to be supported on a flat surface by a third loop also capable of being the corresponding first loop and the corresponding second loop by way of a portion of the third loop contacting the flat surface.

In yet another aspect, a system includes a portable electronic device, and a grip device. The grip device includes a main frame configured to be attached to a surface associated with the portable electronic device via a first surface thereof, and a flexible strap including a first slide element and a second slide element proximate a first end and a second end thereof respectively. The main frame includes a channel across a second surface thereof. The first slide element and the second slide element are configured to be received through the channel to enable movable attachment of the flexible strap to the main frame via the channel in accordance with sliding movement of the first slide element and the second slide element relative to one another across the channel based on a force applied to the flexible strap by a user of the portable electronic device.

The sliding movement enables the first slide element and the second slide element to both be aligned along a first direction whereby insertion of a finger of the user through a first loop formed by the flexible strap following the alignment along the first direction enables a first operation associated with the portable electronic device in a portrait orientation thereof through one or more other finger(s) of the user when the grip device is attached to the surface associated with the portable electronic device, and the first slide element and the second slide element to both be aligned along a second direction perpendicular to the first direction whereby insertion of the finger of the user through a second loop formed by the flexible strap following the alignment along the second direction enables a second operation associated with the portable electronic device in a landscape orientation thereof through the one or more other finger(s) of the user when the grip device is attached to the surface associated with the portable electronic device.

The sliding movement also enables, based on alignment of both the first slide element and the second slide element along a third direction also capable of being the first direction and the second direction and the attachment of the grip device to the surface associated with the portable electronic device, the portable electronic device to be supported on a flat surface by a third loop also capable of being the corresponding first loop and the corresponding second loop by way of a portion of the third loop contacting the flat surface.

The methods and systems disclosed herein may be implemented in any means for achieving various aspects. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of a grip device to enable a number of operations associated with a portable electronic device based on attachment thereto. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1:
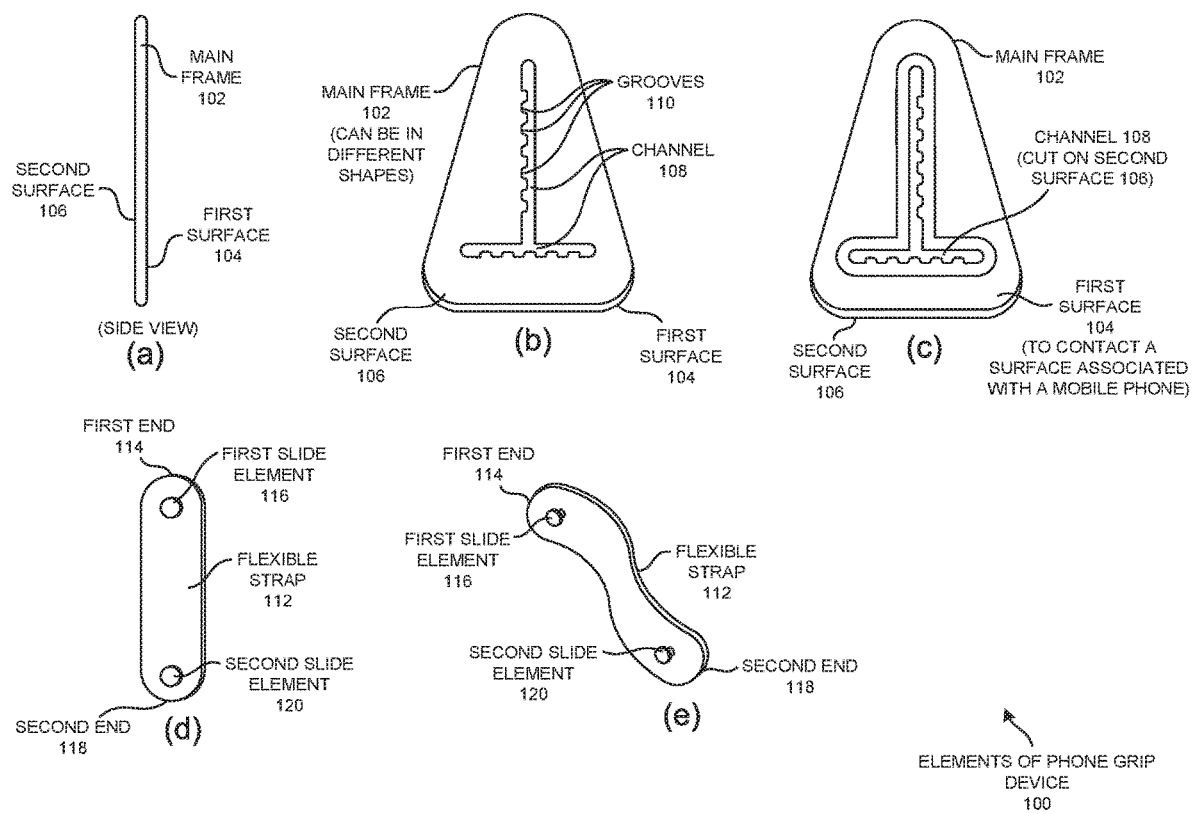
FIG. 1 is a schematic view of a phone grip device configured to be attached to a surface associated with a mobile phone, according to one or more embodiments.

FIG. 1 shows a phone grip device 100 configured to be attached (to be discussed below) to a surface associated with a mobile phone, according to one or more embodiments. It should be noted that while exemplary embodiments have been discussed with reference to a mobile phone, concepts associated with phone grip device 100 may be applicable to a more generic portable electronic device, examples of which may include but are not limited to a mobile phone, a smart media player, and a tablet. Thus, phone grip device 100 may be interpreted as a device configured to be attached to (and, thereby, to grip onto) the aforementioned generic portable electronic device. The use of phone grip device 100 throughout the Specification is merely for the sake of illustrative and referential convenience.

As shown in the side view of phone grip device 100 in FIG. 1(a), in one or more embodiments, phone grip device 100 may include a main frame 102 configured to be attached to a surface associated with a mobile phone (again, to be discussed below) by way of a first surface 104 thereof. In one or more embodiments, main frame 102 may be a rigid, a semi-rigid or a flexible structure configured to serve as a backbone of phone grip device 100 and associated operations thereof. While main frame 102 may be configured to be preferentially attached to a center portion of the surface associated with the mobile phone, it should be noted that all possible positions of attachment are within the scope of the exemplary embodiments discussed herein. Further, all possible shapes (e.g., regular, irregular) of main frame 102 of phone grip device 100 are within the scope of the exemplary embodiments discussed herein.

In one or more embodiments, first surface 104 of main frame 102 may be coated with an adhesive material to attach (e.g., removably) with the surface associated with the mobile phone. In some other embodiments, the attachment of first surface 104 with the surface associated with the mobile phone may be through magnetic means or through means such as VELCRO®. All possible means of attachment of first surface 104 with the surface associated with the mobile phone and combinations thereof are within the scope of the exemplary embodiments discussed herein.

FIG. 1(b) shows a second surface 106 of main frame 102 across which a channel 108 may be formed, according to one or more embodiments. In one or more embodiments, channel 108 may be a track including grooves 110 (e.g., based on cuts) formed therewith configured to enable reception of slide elements (e.g., first slide element 116 and second slide element 120; refer to FIGS. 1(d) and 1(e)) therewithin to be locked/engaged at a specific position along channel 108. It should be noted that channel 108 may be formed all the way through a depth of main frame 102 into first surface 104, as shown in FIG. 1(c). However, implementations in which a depth of channel 108 is less than the depth of main frame 102 are also within the scope of the exemplary embodiments discussed herein.

In one or more embodiments, channel 108 may be linear or curved in shape. In some embodiments, channel 108 may be a combination of a linear and a curved channel. In one or more embodiments, channel 108 may be a set of channels contiguous and continuous with one another; in some other embodiments, channel 108 may include a set of channels, at least some of which are discontinuous with one another. Further, channel 108 may be irregular in shape. The depiction of channel 108 across this Specification may, therefore, not be considered limiting.

FIGS. 1(d) and 1(e) show a flexible strap 112 (e.g., an elastic strap) that is configured to form part of phone grip device 100, according to one or more embodiments. It should be noted that flexible strap 112 forms part of a mere example implementation of phone grip device 100. Other implementations involving rings and more rigid elements are within the scope of the exemplary embodiments discussed herein. The "adjective" flexible is a relative term that may encompass other materials deemed to be semi-rigid or rigid. In one or more embodiments, flexible strap 112 may include a first slide element 116 and a second slide element 120 proximate a first end 114 and a second end 118 thereof respectively. As shown in FIGS. 1(d) and 1(e), first slide element 116 and second slide element 120 may be each be a protrusion (e.g., a hook element) from a surface of flexible strap 112 that ends in an element with a flat surface (e.g., disc-shaped); the aforementioned element along with the corresponding protrusion may enable each of first slide element 116 and second slide element 120 to be locked under a groove 110 of channel 108.

In one or more embodiments, the abovementioned locking may enable sliding movement of first slide element 116 and second slide element 120 along channel 108 relative to one another in accordance with a force applied by a user of phone grip device 100. In one or more embodiments, the aforementioned relative movement may encompass a first scenario involving a slide element (e.g., first slide element 116) being stationary and another slide element (e.g., second slide element 120) sliding along channel 108, a second scenario involving the another slide element (e.g., second slide element 120) being stationary and the slide element (e.g., first slide element 116) sliding along channel 108, and a third scenario involving both slide elements (e.g., first slide element 116 and second slide element 120) sliding along channel 108. The configuration(s) and structure(s) of first slide element 116 and second slide element 120 are not limited to those depicted in FIG. 1.

Figure 2:
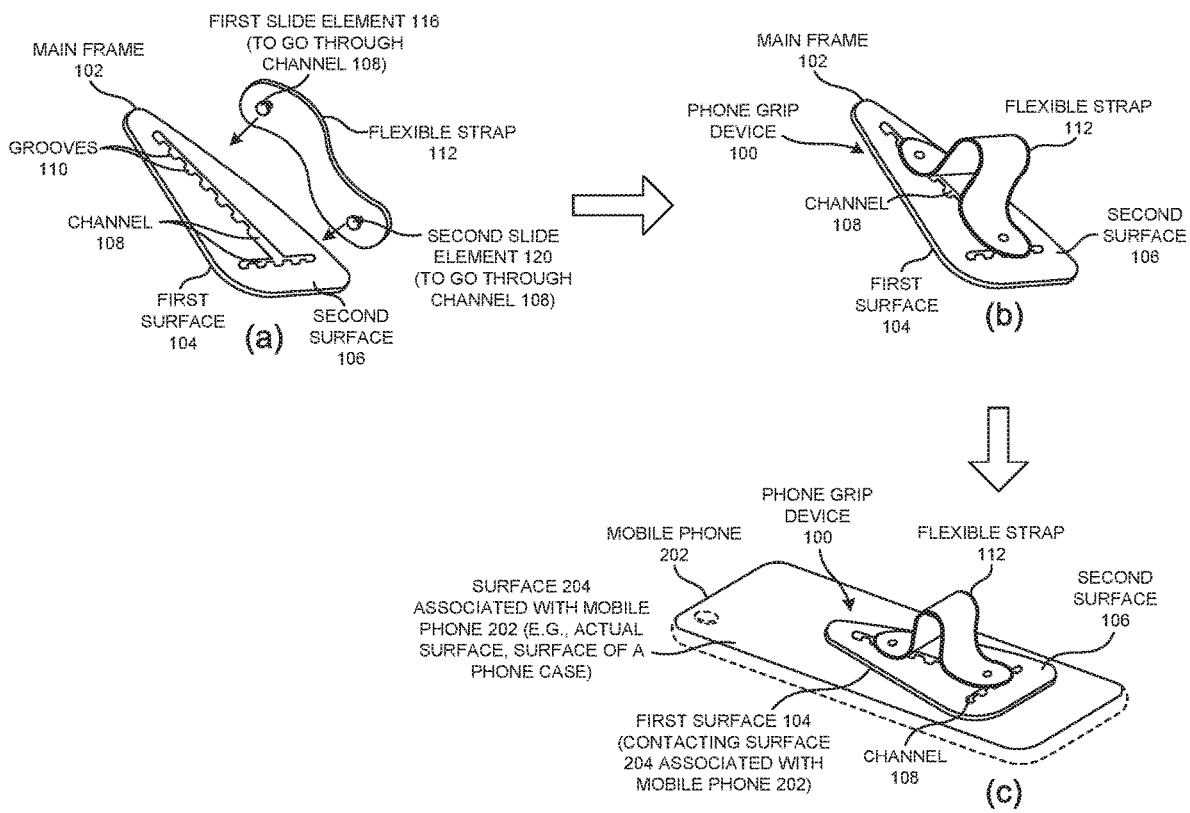
FIG. 2 is a schematic view of coupling of the phone grip device of FIG. 1 to a mobile phone, according to one or more embodiments.

FIG. 2 shows coupling of phone grip device 100 to a surface 204 associated with a mobile phone 202, according to one or more embodiments. In one or more embodiments, surface 204 associated with mobile phone 202 may be an actual surface of mobile phone 202 or a surface of a case of mobile phone 202. For the aforementioned reason, a portion of mobile phone 202 barring surface 204 (which can also be the surface of the case of mobile phone 202) is shown in dotted lines in FIG. 2. As shown in FIG. 2(a), flexible strap 112 with first slide element 116 and second slide element 120 may be brought close to channel 108, following which the aforementioned first slide element 116 and second slide element 120 may be slid through channel 108 to be received therewithin, as shown in FIG. 2(b).

In one or more embodiments, first slide element 116 and second slide element 120 may then be free to move across channel 108 relative to one another based on the force applied by a user of phone grip device 100. In one or more embodiments, without the force, first slide element 116 and second slide element 120 may remain locked onto grooves 110 of phone grip device 100. An example scenario of the force applied by the user may involve the user (e.g., user 310 of FIG. 3) pulling (e.g., along a location proximate first end 114 or second end 118, along a location proximate a middle portion of flexible strap 112) flexible strap 112 along a desired direction with a hand thereof to effect the relative sliding movement of first slide element 116 and second slide element 120.

FIG. 2(c) shows phone grip device 100 attached to surface 204 associated with mobile phone 202. Again, as discussed above, mobile phone 202 is a mere example device to which phone grip device 100 is directly or indirectly coupled. It should be noted that phone grip device 100 may be attached to any portable electronic device. In one or more embodiments, surface 204 may be a rear exterior surface of mobile phone 202. In one or more other embodiments, surface 204 may be an exterior surface of a case of mobile phone 202.

Figure 3:
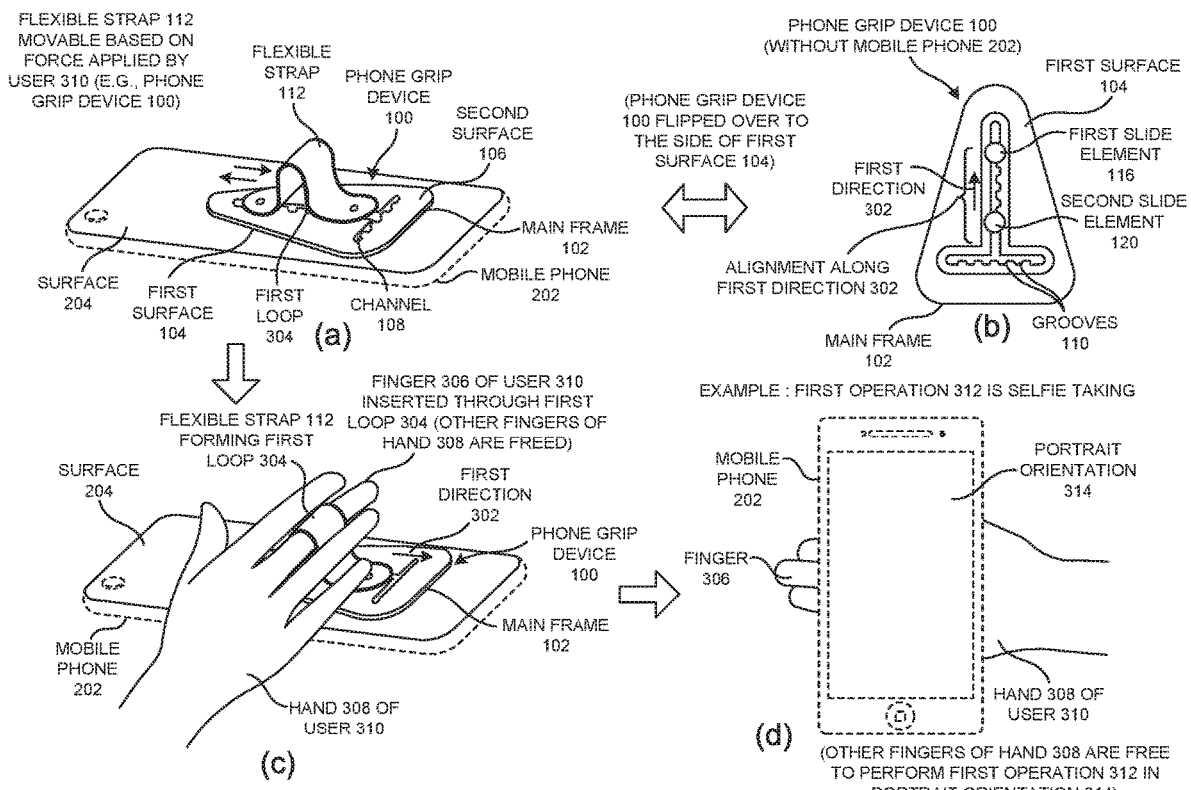
FIG. 3 is a schematic view of alignment of a first slide element and a second slide element of a flexible strap of the phone grip device of FIGS. 1-2 along a first direction when attached to the mobile phone of FIG. 2, according to one or more embodiments.

FIG. 3 shows alignment of first slide element 116 and second slide element 120 of phone grip device 100 along a first direction 302 when attached to mobile phone 202, according to one or more embodiments. In one or more embodiments, the relative movement of first slide element 116 and second slide element 120 along channel 108 based on a force applied by a user 310 of phone grip device 100 may enable choice of a specific position of alignment of first slide element 116 and second slide element 120 along channel 108 with respect to user 310. FIG. 3(a) shows movement of flexible strap 112 configured to effect the relative motion of first slide element 116 and second slide element 120 of phone grip device 100 by way of arrows.

In one or more embodiments, once first slide element 116 and second slide element 120 are aligned along first direction 302 along channel 108, flexible strap 112 may form a first loop 304 (e.g., a partially open curve), as shown in FIGS. 3(a) and 3(c). It should be noted that FIG. 3(b) depicts phone grip device 100 (without mobile phone 202 for the sake of illustrative convenience) flipped over to the side of first surface 104. FIG. 3(b) clearly shows first slide element 116 and second slide element 120 aligned along first direction 302 along channel 108. It is obvious that first slide element 116 and second slide element 120 may be received through channel 108, moved relative to one another and locked to a position corresponding to the alignment along first direction 302.

It should be noted that the alignment along first direction 302 and first loop 304 may still be destroyed based on another force applied by a hand 308 of user 310. However, in one or more embodiments, as shown clearly in FIGS. 3(a) and 3(c), the alignment along first direction 302 may enable flexible strap 112 to form first loop 304. In one or more embodiments, user 310 may be able to insert a finger 306 of hand 308 thereof through first loop 304 and pick up/lift mobile phone 202 via phone grip device 100. In one or more embodiments, one or more other finger(s) of hand 308 may be freed to perform operations such as gripping mobile phone 202, taking a selfie through mobile phone 202 and so on. FIG. 3(d) shows one or more other finger(s) of hand 308 being free to perform a first operation 312 in a portrait orientation 314 of mobile phone 202. FIG. 3 shows selfie taking through mobile phone 202 as an example first operation 312 through the one or more other finger(s) of hand 308 of user 310. Portrait and landscape orientations are well known to one skilled in the art. Detailed discussed thereof is, therefore, skipped for the sake of convenience and brevity. In the example scenarios depicted in FIG. 3, first direction 302 may be along a length of mobile phone 202.

Figure 4:
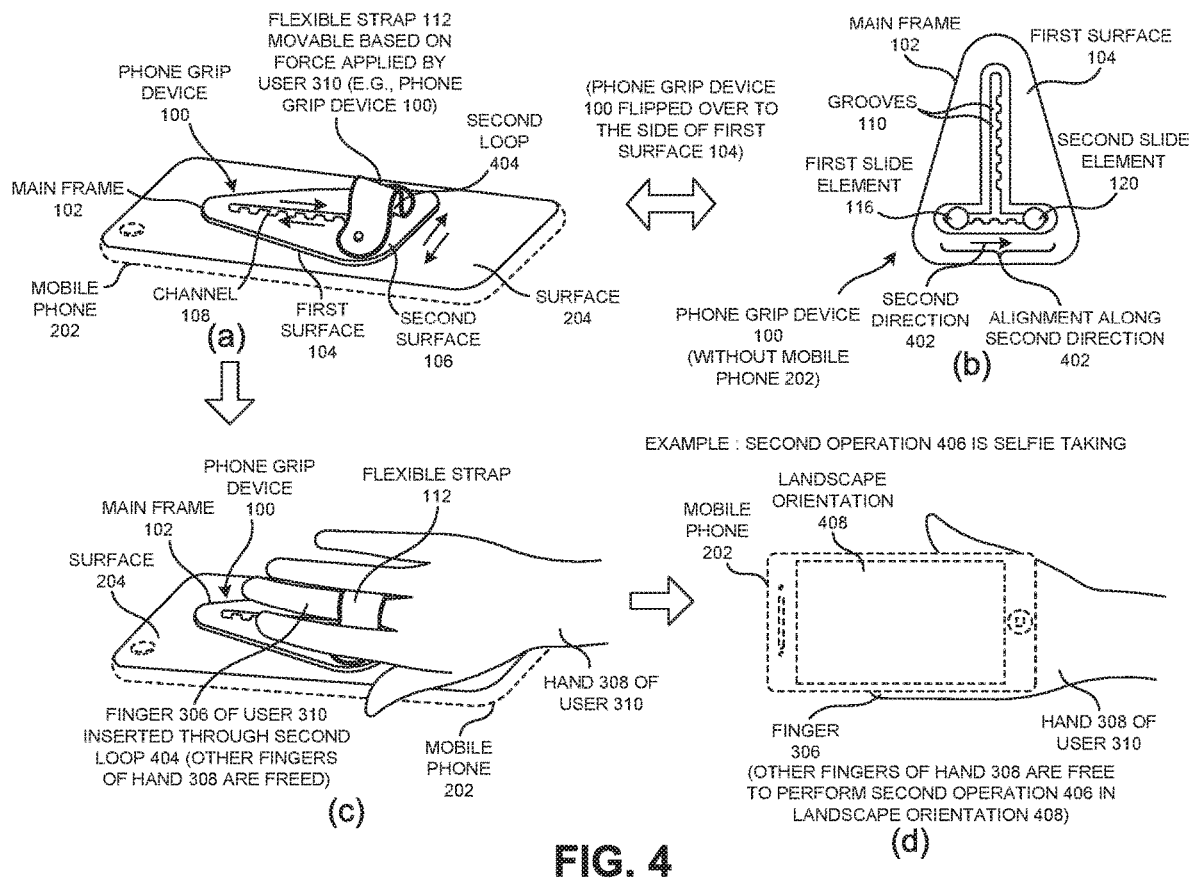
FIG. 4 is a schematic view of alignment of the first slide element and the second slide element of the flexible strap of the phone grip device of FIGS. 1-2 along a second direction when attached to the mobile phone of FIG. 2, according to one or more embodiments.

FIG. 4 shows alignment of first slide element 116 and second slide element 120 of phone grip device 100 along a second direction 402 when attached to mobile phone 202, according to one or more embodiments. Again, in one or more embodiments, the relative movement of first slide element 116 and second slide element 120 along channel 108 based on a force applied by user 310 of phone grip device 100 may enable choice of another specific position of alignment of first slide element 116 and second slide element 120 along channel 108 with respect to user 310. FIG. 4(a) shows movement of flexible strap 112 configured to effect the relative motion of first slide element 116 and second slide element 120 of phone grip device 100 by way of arrows.

In one or more embodiments, while FIG. 3 showed relative movement of first slide element 116 and second slide element 120 along the length of mobile phone 202, FIG. 4 shows the capability of relative movement of first slide element 116 and second slide element 120 along a width of mobile phone 202 perpendicular to the length thereof, according to one or more embodiments. In one or more embodiments, once first slide element 116 and second slide element 120 are aligned along second direction 402 along channel 108, flexible strap 112 may form a second loop 404 (e.g., another partially open curve), as shown in FIGS. 4(a) and 4(c). It should be noted that FIG. 4(b) depicts phone grip device 100 (without mobile phone 202 for the sake of illustrative convenience) flipped over to the side of first surface 104. FIG. 4(b) clearly shows first slide element 116 and second slide element 120 aligned along second direction 402 along channel 108.

Again, it should be noted that the alignment along second direction 402 and second loop 404 may still be destroyed based on another force applied by a hand 308 of user 310. However, in one or more embodiments, as shown clearly in FIGS. 4(a) and 4(c), the alignment along second direction 402 may enable flexible strap 112 to form second loop 404. In one or more embodiments, user 310 may be able to insert finger 306 thereof through second loop 404 and pick up/lift mobile phone 202 via phone grip device 100. In one or more embodiments, now, one or more other finger(s) of hand 308 may be freed to perform operations such as gripping mobile phone 202, taking a selfie through mobile phone 202 and so on. FIG. 4(d) shows one or more other finger(s) of hand 308 being free to perform a second operation 406 in a landscape orientation 408 of mobile phone 202. FIG. 4 also shows selfie taking through mobile phone 202 as an example second operation 406 through the one or more other finger(s) of hand 308 of user 310. Also, it is obvious that not only second operation 406 may be different from first operation 312, but also second operation 406 and first operation 312 may involve operations other than selfie taking.

Figure 5:
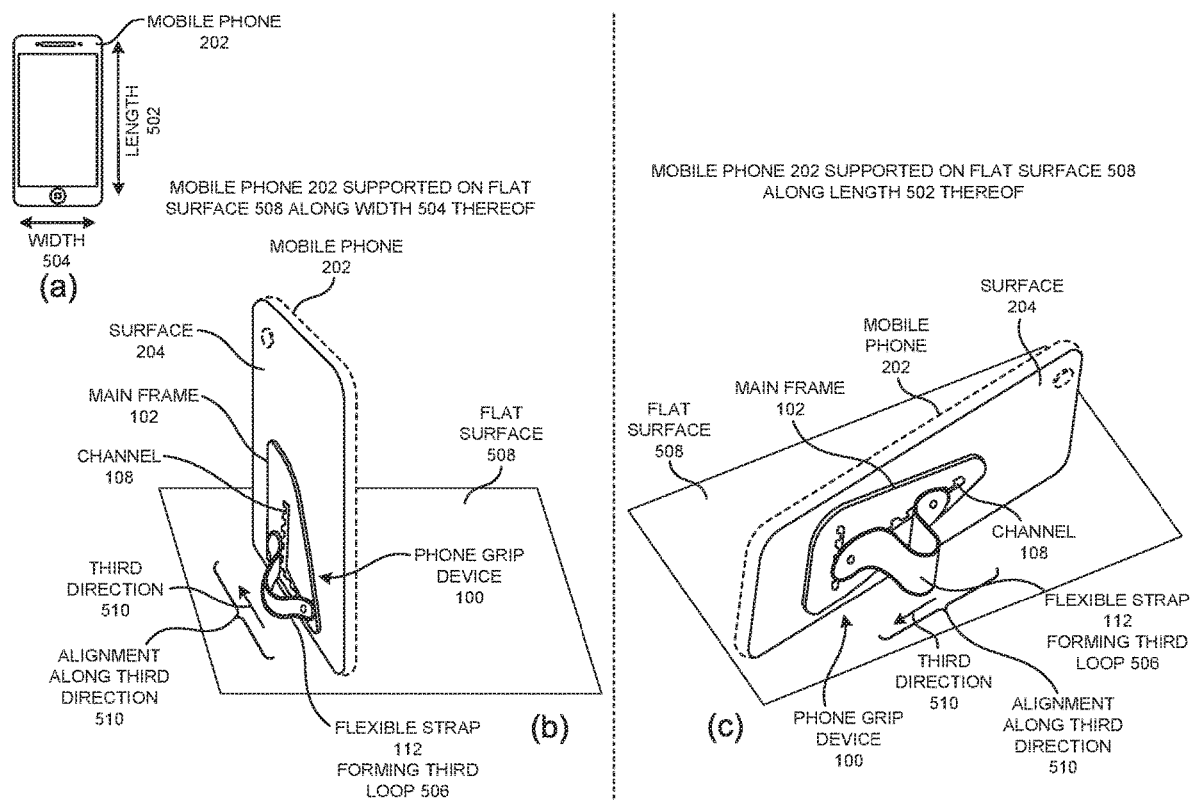
FIG. 5 is a schematic view of support of the mobile phone of FIG. 2 on a flat surface by way of the phone grip device of FIGS. 1-4, according to one or more embodiments.

FIG. 5 shows support of mobile phone 202 on a flat surface 508, according to one or more embodiments. To provide context, FIG. 5(a) shows a length 502 and a width 504 of mobile phone 202. It is obvious that width 504 may be perpendicular to length 502. FIG. 5(b) shows alignment of first slide element 116 and second slide element 120 of phone grip device 100 attached to mobile phone 202 along a third direction 510 along channel 108, according to one or more embodiments. In one or more embodiments, the alignment along third direction 510 may enable flexible strap 112 to form a third loop 506. In one or more embodiments, third direction 510 may be capable of being second direction 402; similarly, third loop 506 may be capable of being second loop 404.

As shown in FIG. 5(b), in one or more embodiments, mobile phone 202 may be supported on flat surface 508 along width 504 thereof by third loop 506; the aforementioned support may be enabled by way of a portion of third loop 506 contacting flat surface 508. In one or more embodiments, the aforementioned support may entail mobile phone 202 being at least a bit inclined with respect to flat surface 508. In one or more embodiments, the angle of inclination may depend on a position of attachment of phone grip device 100 to mobile phone 202.

FIG. 5(c) also shows alignment of first slide element 116 and second slide element 120 of phone grip device 100 attached to mobile phone 202 along third direction 510 along channel 108, according to one or more embodiments. Again, in one or more embodiments, the alignment along third direction 510 may enable flexible strap 112 to form third loop 506. In one or more embodiments, third direction 510 may, again, be capable of being first direction 302; similarly, third loop 506 may be capable of being first loop 304. Again, FIG. 5(c) shows support of mobile phone 202 on flat surface 508 along length 502 thereof by third loop 506; again, the aforementioned support may be enabled by way of a portion of third loop 506 contacting flat surface 508. In one or more embodiments, again, the aforementioned support may entail mobile phone 202 being at least a bit inclined with respect to flat surface 508. In one or more embodiments, again, the angle of inclination may depend on a position of attachment of phone grip device 100 to mobile phone 202.

Figure 6:
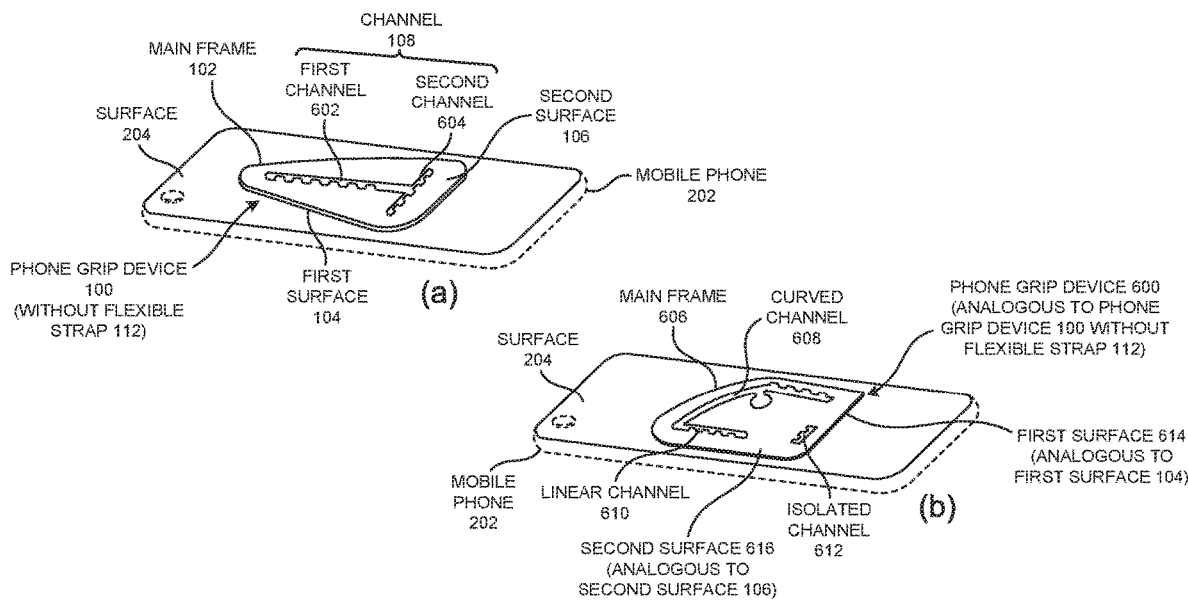
FIG. 6 is a schematic view of embodiments of a channel of a main frame of a phone grip device.

It should be noted that third loop 506 may be different from first loop 304 and second loop 404, and third direction 510 may be different from first direction 302 and second direction 402. Further, in some embodiments, phone grip device 100 itself may be slidable across mobile phone 202 to enable modification of the angle of inclination of mobile phone 202 with respect to flat surface 508. FIG. 6 shows embodiments of a channel (e.g., channel 108, curved channel 608, linear channel 610, isolated channel 612) of a main frame (e.g., main frame 102, main frame 606) of a phone grip device (e.g., phone grip device 100, phone grip device 600), according to one or more embodiments. FIG. 6(a)

shows phone grip device 100 attached to mobile phone 202, with channel 108 including first channel 602 and second channel 604 perpendicular to and intersecting one another, according to one or more embodiments. In one or more embodiments, first channel 602 and second channel 604 may be contiguous and continuous with one another to form a closed circuit.

FIG. 6(b) shows a phone grip device 600 analogous to phone grip device 100, according to one or more embodiments. Concepts discussed herein with respect to phone grip device 600 are within the scope of the exemplary embodiments discussed herein. In one or more embodiments, phone grip device 600 may include a main frame 606 analogous to main frame 102, a first surface 614 analogous to first surface 104, and a second surface 616 analogous to second surface 106. In one or more embodiments, main frame 606 may have a linear channel 610 implemented thereon in conjunction with a curved channel 608. It should be noted that, in some embodiments, main frame 606 may solely include curved channel 608. Here, in one or more embodiments, linear channel 610 may be continuous and contiguous with curved channel 608 to form another closed circuit.

Figure 7:
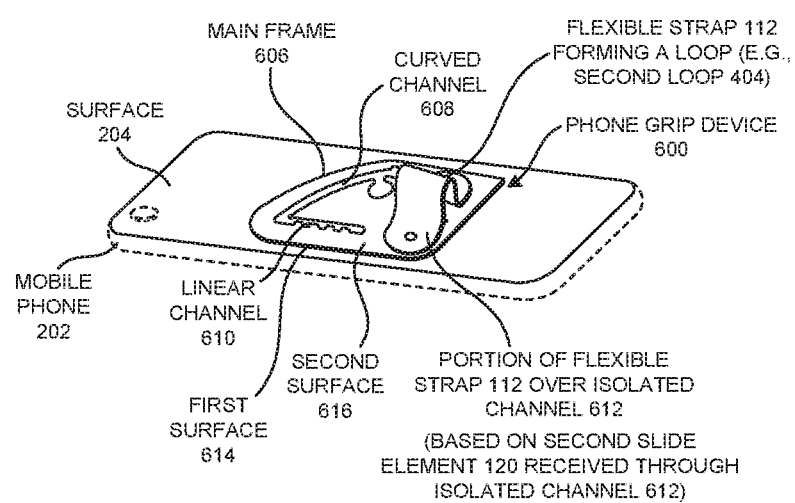
FIG. 7 is a schematic view of coupling of the phone grip device of FIG. 6 to the mobile phone of FIG. 2, according to one or more embodiments.

In one or more embodiments, main frame 606 may also include an isolated channel 612 (e.g., linear in shape) non-continuous and non-contiguous with linear channel 610 and curved channel 608. The aforementioned channels may be configured to receive first slide element 116 and second slide element 120 therethrough to effect the relative sliding movement discussed above. FIG. 7 shows flexible strap 112 connected through one or more channel(s) (e.g., isolated channel 612, curved channel 608, linear channel 610) to form phone grip device 600 that may, in turn, be connected to surface 204 associated with mobile phone 202, according to one or more embodiments.

In a state of connection of phone grip device 600 with mobile phone 202 depicted in FIG. 7, a portion of flexible strap 112 may be over isolated channel 612 based on reception of second slide element 120 therethrough. First slide element 116 may be received through curved channel 608, thereby enabling alignment of first slide element 116 and second slide element 120 across radial directions with respect to curved channel 608. It is obvious that first slide element 116 may also be received through linear channel 610. Further, other configurations of the channels and/or other alignments (e.g., along first direction 302, second direction 402 and third direction 510) of the slide elements are within the scope of the exemplary embodiments discussed herein.

Figure 8:
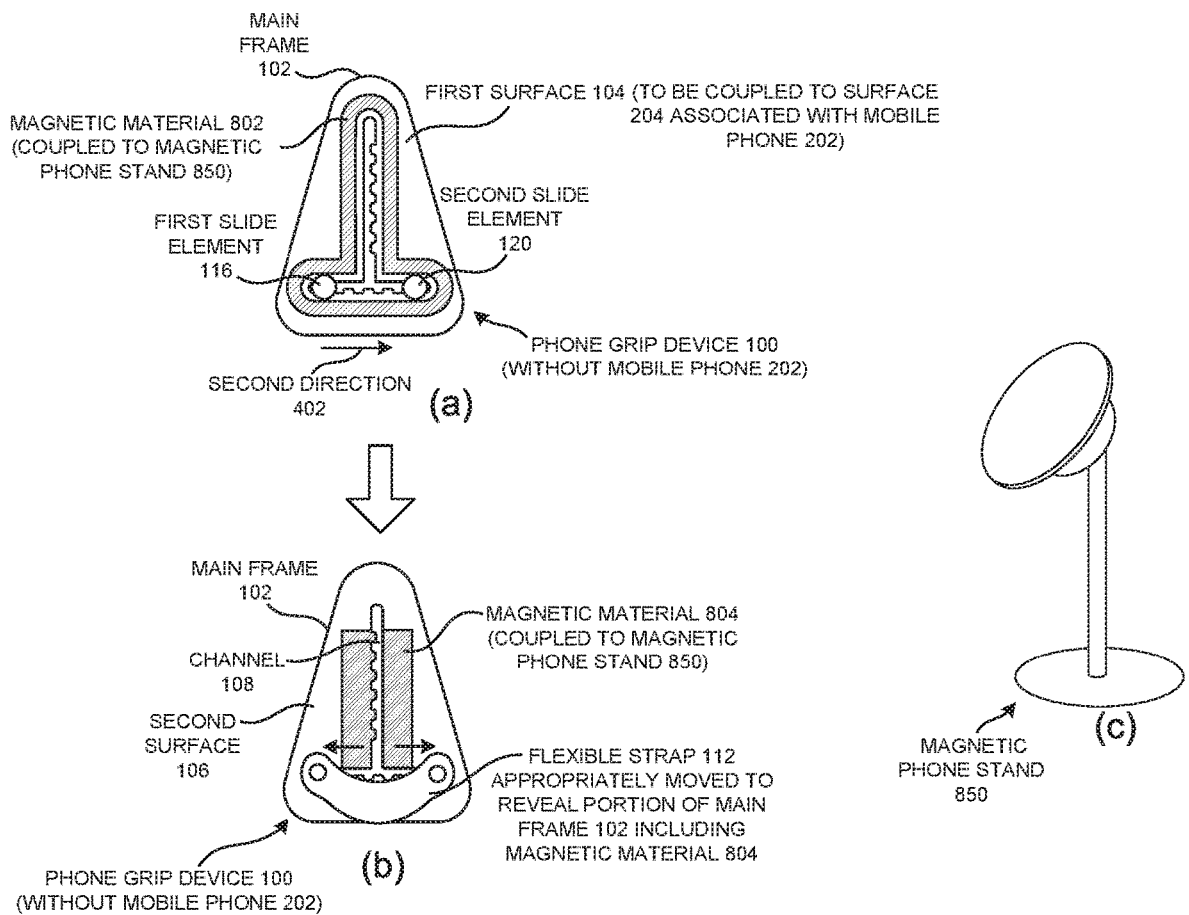
FIG. 8 is a schematic view of implementations of a phone grip device configured to enable coupling of the mobile phone of FIG. 2 to a magnetic phone stand even when the phone grip device is connected to the mobile phone, according to one or more embodiments.

In one or more embodiments, phone grip device 100/600 may be coupled to a magnetic phone stand even in the state of connection thereof to mobile phone 202. FIG. 8 demonstrates enablement of the aforementioned capability, according to one or more embodiments. In one example implementation shown in FIG. 8(a), on first surface 104, at least a portion of main frame 102 around channel 108 may be made of a magnetic material 802 (e.g., steel). As first surface 104 is configured to be attached to surface 204 associated with mobile phone 202 (FIG. 8 does not show mobile phone 202 for the sake of illustrative convenience), phone grip device 100, and, thereby, mobile phone 202, may be coupled to a magnetic phone stand 850 (refer to FIG. 8(c)) even in the state of attachment thereof.

FIG. 8(b) illustrates another example implementation in which at least a portion of main frame 102 on second surface 106 is made of a magnetic material 804 (e.g., steel; same magnetic material as magnetic material 802 or a different magnetic material). In the state of attachment of phone grip device 100 to mobile phone 202, magnetic material 804 may enable direct coupling of phone grip device 100 and mobile phone 202 to magnetic phone stand 850. It should be noted that magnetic phone stand 850 may be generically referred to as magnetic portable electronic device stand. Just like mobile phone 202 is used herein instead of a portable electronic device for the sake of referential convenience, magnetic phone stand 850 is used herein instead of the magnetic portable electronic device stand.

Figure 9:
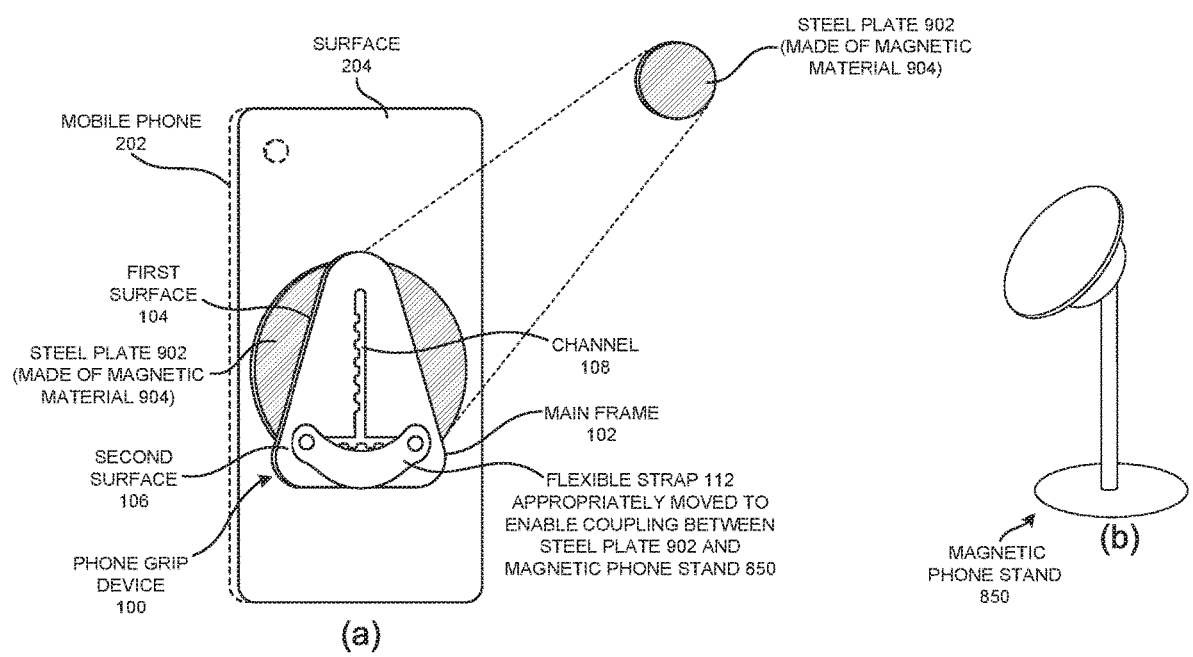
FIG. 9 is another schematic view of an implementation of a steel plate configured to enable coupling of the mobile phone of FIG. 2 to the magnetic phone stand of FIG. 8 even when a phone grip device is connected to the mobile phone, according to one or more embodiments.

FIG. 9 shows an implementation of a steel plate 902 on surface 204 associated with mobile phone 202 configured to enable coupling of mobile phone 202 to magnetic phone stand 850 even with phone grip device 100 attached to mobile phone 202, according to one or more embodiments. In one or more embodiments, steel plate 902 may be made of a magnetic material 904 (e.g., same as magnetic material 802/804, different therefrom) and may be attached to surface 204. Although FIG. 9 shows attachment of steel plate 902 to an exterior of surface 204, it should be noted that steel plate 902 may also be coupled behind surface 204 to effect the coupling thereof to mobile phone 202.

Now, in one or more embodiments, phone grip device 100 may be coupled onto plate 902 or onto surface 204 to be coupled to mobile phone 202. In one or more embodiments, as shown in FIG. 9, appropriate sliding movement of flexible strap 112 and coupling of steel plate 902 to mobile phone 202 may enable the coupling (e.g., magnetic) of mobile phone 202 to magnetic phone stand 850 shown in FIG. 9(c) even with phone grip device 100 still attached to surface 204 associated with mobile phone 202.

Figure 10:
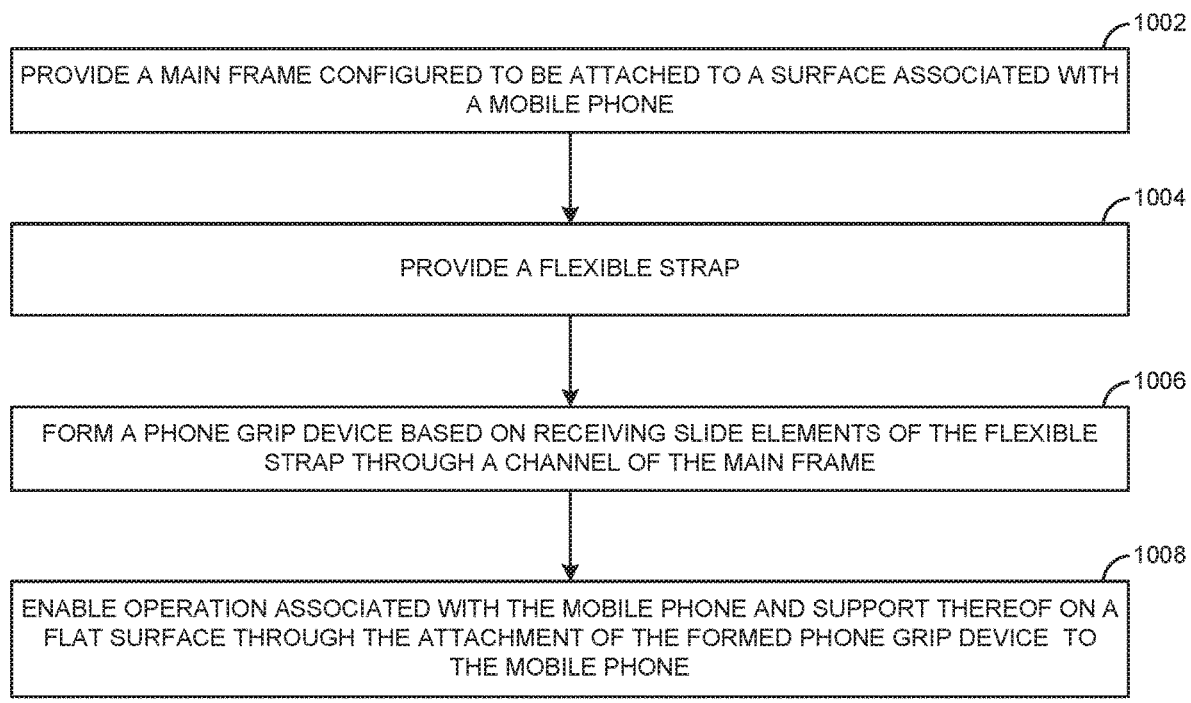
FIG. 10 is a process flow diagram detailing the operations involved in realizing a grip device, according to one or more embodiments.

FIG. 10 shows a process flow detailing the operations involved in realizing a grip device (e.g., phone grip device 100) configured to be attached to a portable electronic device (e.g., mobile phone 202), according to one or more embodiments. In one or more embodiments, operation 1002 may involve providing a main frame (e.g., main frame 102) configured to be attached to a surface (e.g., surface 204) associated with the portable electronic device. In one or more embodiments, the aforementioned attachment may be effected via a first surface (e.g., surface 104) of the main frame. In one or more embodiments, the main frame may include a channel (e.g., channel 108) across a second surface (e.g., surface 106) thereof.

In one or more embodiments, operation 1004 may involve providing a flexible strap (e.g., flexible strap 112). In one or more embodiments, the flexible strap may include a first slide element (e.g., first slide element 116) and a second slide element (e.g., second slide element 120) proximate a first end (e.g., first end 114) and a second end (e.g., second end 118) thereof respectively. In one or more embodiments, operation 1006 may involve forming the grip device based on receiving the slide elements of the flexible strap through the channel of the main frame. In one or more embodiments, the aforementioned formation may enable movable attachment of the flexible strap to the main frame via the channel in accordance with sliding movement of the first slide element and the second slide element relative to one another across the channel based on a force applied to the flexible strap by a user of the grip device.

In one or more embodiments, operation 1008 may involve enabling operations associated with the portable electronic device and support thereof on a flat surface (e.g., flat surface 508) through the attachment of the formed grip device to the portable electronic device. In accordance therewith and the sliding movement of the first slide element and the second slide element of the flexible strap relative to one another across the channel, in one or more embodiments, the grip device may enable the first slide element and the second slide element to both be aligned along a first direction (e.g., first direction 302) whereby insertion of a finger (e.g., finger 306) of a user (e.g., user 310) of the grip device through a first loop (e.g., first loop 304) formed by the flexible strap following the alignment along the first direction enables a first operation (e.g., first operation 312) associated with the portable electronic device in a portrait orientation (e.g., portrait orientation 314) thereof through one or more other finger(s) of the user when the grip device is attached to the surface associated with the portable electronic device.

In one or more embodiments, the grip device may also enable the first slide element and the second slide element to both be aligned along a second direction (e.g., second direction 402) perpendicular to the first direction whereby insertion of the finger of the user through a second loop (e.g., second loop 404) formed by the flexible strap following the alignment along the second direction enables a second operation (e.g., second operation 406) associated with the portable electronic device in a landscape orientation (e.g., landscape orientation 408) thereof through the one or more other finger(s) of the user when the grip device is attached to the surface associated with the portable electronic device.

In one or more embodiments, based on alignment of both the first slide element and the second slide element along a third direction (e.g., third direction 510) also capable of being the first direction and the second direction and the attachment of the grip device to the surface associated with the portable electronic device, the grip device may further enable the portable electronic device to be supported on the flat surface by a third loop (e.g., third loop 506) also capable of being the corresponding first loop and the corresponding second loop by way of a portion of the third loop contacting the flat surface.

Figure 11:
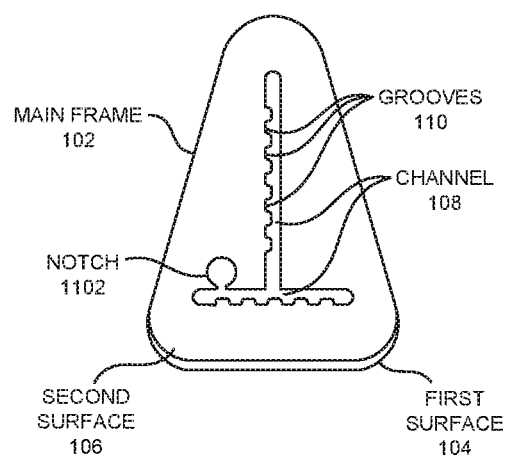
FIG. 11 is a schematic view of another example implementation of the main frame of the phone grip device of FIG. 1.

FIG. 11 shows another example implementation of main frame 102 of phone grip device 100. The aforementioned example implementation is within the scope of the exemplary embodiments discussed herein. Here, channel 108 may have a separate section (e.g., a notch 1102) implemented therein where first slide element 116 and second slide element 120 of flexible strap 112 may be removed one after the other to enable replacement of flexible strap 112 without having to remove main frame 102 from surface 204 associated with mobile phone 202 in the state of connection thereof. It is obvious from FIG. 11 that even when main frame 102 is attached to surface 204 associated with mobile phone 202, first slide element 116 and second slide element 120 may be slid across channel 108 until notch 1102 is reached; the appropriate size of notch 1102 may enable removal of flexible strap 112 based on removing first slide element 116 and second slide element 120 through notch 1102. All reasonable variations are within the scope of the exemplary embodiments discussed herein.

Thus, exemplary embodiments may provide for a grip device configured to be coupled to a portable electronic device to enable a number of operations associated therewith. In one or more embodiments, the grip device (e.g., phone grip device 100) may enable efficiency, simultaneity and/or stability of the operations associated with the portable electronic device.

Although the present embodiments have been described with reference to specific example embodiments, it will be evident that various modifications and changes may be made to these embodiments without departing from the broader spirit and scope of the various embodiments. Accordingly, the Specification and drawings are to be regarded in an illustrative rather than a restrictive sense.

What is claimed is:

1. A grip device for a portable electronic device comprising:
a main frame configured to be attached to a surface associated with the portable electronic device via a first surface thereof the main frame comprising a channel across a second surface thereof; and
a flexible strap comprising a first slide element and a second slide element proximate a first end and a second end thereof respectively, the first slide element and the second slide element being receivable through the channel to movably attach the flexible strap to the main frame via the channel in accordance with sliding movement of the first slide element and the second slide element relative to one another across the channel based on a force applied to the flexible strap by a user of the grip device, and, further, in accordance with the sliding movement of the first slide element and the second slide element relative to one another across the channel:
the first slide element and the second slide element are both aligned along a first direction whereby, in a first configuration of the alignment of the first slide element and the second slide element along the first direction:
attachment of the grip device to the portable electronic device by way of the first surface of the grip device and the surface associated with the portable electronic device and insertion of a finger of the user through a first loop formed by the flexible strap render the portable electronic device usable in a portrait orientation thereof via at least one other finger of the user,
the first slide element and the second slide element are both aligned along a second direction perpendicular to the first direction whereby, in a second configuration of the alignment of the first slide element and the second slide element along the second direction:
the attachment of the grip device to the portable electronic device by way of the first surface of the grip device and the surface associated with the portable electronic device and insertion of the finger of the user through a second loop formed by the flexible strap render the portable electronic device usable in a landscape orientation thereof via the at least one other finger of the user, and
alignment of both the first slide element and the second slide element along a third direction and the attachment of the grip device to the surface associated with the portable electronic device render the portable electronic device supportable on a flat surface by a third loop by way of a portion of the third loop contacting the flat surface,
wherein the channel comprises a linear first channel and a linear second channel, the linear first channel and the linear second channel intersecting perpendicularly to one another in a T-shaped configuration, and
wherein the first slide element and the second slide element are both configured to be received in and slide across the linear first channel and the linear second channel.

2. The grip device of claim 1, wherein the main frame is attachable to one of: a surface of the portable electronic device and a surface of a case of the portable electronic device as the surface associated with the portable electronic device.

3. The grip device of claim 1, wherein the third loop is one of: the first loop and the second loop.

4. The grip device of claim 1, wherein, based on the alignment of both the first slide element and the second slide element along the third direction and the attachment of the grip device to the surface associated with the portable electronic device, the portable electronic device is positionable on the flat surface both along a length and a width thereof.

5. The grip device of claim 1, wherein the third direction is one of: the first direction and the second direction.

6. The grip device of claim 1, wherein at least one of:
at least a portion of the main frame is made of a magnetic material,
the main frame is couplable to a plate made of the magnetic material such that, based on an appropriate sliding movement of the flexible strap and a coupling of the plate to the portable electronic device, the portable electronic device is couplable to a magnetic phone stand via the plate even with the grip device still attached to the surface associated with the portable electronic device, and
the main frame includes a notch implemented in the channel to remove the flexible strap by way of the first slide element and the second slide element therethrough without separating the grip device from the portable electronic device when the grip device is attached to the portable electronic device.

7. The grip device of claim 1, wherein the channel of the main frame comprises a plurality of grooves therealong to lock, at least one of: the first slide element and the second slide element to a specific position along the channel including the first configuration, the second configuration, and the alignment of both the first slide element and the second slide element along the third direction.

8. A method comprising:
providing a main frame attachable to a surface associated with a portable electronic device via a first surface thereof, the main frame comprising a channel across a second surface thereof;
providing a flexible strap comprising a first slide element and a second slide element proximate a first end and a second end thereof respectively;
forming a grip device based on receiving the first slide element and the second slide element through the channel to movably attach the flexible strap to the main frame via the channel in accordance with sliding movement of the first slide element and the second slide element relative to one another across the channel based on a force applied to the flexible strap by a user of the grip device; and
further, in accordance with the sliding movement of the first slide element and the second slide element of the flexible strap relative to one another across the channel, configuring the grip device such that:
the first slide element and the second slide element are both aligned along a first direction whereby, in a first configuration of the alignment of the first slide element and the second slide element along the first direction:
attachment of the grip device to the portable electronic device by way of the first surface of the grip device and the surface associated with the portable electronic device and insertion of a finger of the user through a first loop formed by the flexible strap render the portable electronic device usable in a portrait orientation thereof via at least one other finger of the user,
the first slide element and the second slide element are both aligned along a second direction perpendicular the first direction whereby, in a second configuration of the alignment of the first slide element and the second slide element along the second direction:
the attachment of the grip device to the portable electronic device by way of the first surface of the grip device and the surface associated with the portable electronic device and insertion of the finger of the user through a second loop formed by the flexible strap render the portable electronic device usable in a landscape orientation thereof via the at least one other finger of the user, and
alignment of both the first slide element and the second slide element along a third direction and the attachment of the grip device to the surface associated with the portable electronic device render the portable electronic device supportable on a flat surface by a third loop by way of a portion of the third loop contacting the flat surface,
wherein the channel comprises a linear first channel and a linear second channel, the linear first channel and the linear second channel intersecting perpendicularly to one another in a T-shaped configuration, and
wherein the first slide element and the second slide element are both configured to be received in and slide across the linear first channel and the linear second channel.

9. The method of claim 8, comprising configuring the main frame to be attached to one of: a surface of the portable electronic device and a surface of a case of the portable electronic device as the surface associated with the portable electronic device.

10. The method of claim 8, comprising the third loop being one of: the first loop and the second loop.

11. The method of claim 8, wherein, based on the alignment of both the first slide element and the second slide element along the third direction and the attachment of the grip device to the surface associated with the portable electronic device, the method comprises providing a capability to the portable electronic device to be positioned on the flat surface both along a length and a width thereof.

12. The method of claim 8, comprising the third direction being one of: the first direction and the second direction.

13. The method of claim 8, further comprising:
at least a portion of the main frame being made of a magnetic material;
coupling the main frame to a plate made of the magnetic material such that, based on an appropriate sliding movement of the flexible strap and a coupling of the plate to the portable electronic device, the portable electronic device is couplable to a magnetic phone stand via the plate even with the grip device still attached to the surface associated with the portable electronic device, and
implementing a notch in the channel of the main frame to remove the flexible strap by way of the first slide element and the second slide element therethrough without separating the grip device from the portable electronic device when the grip device is attached to the portable electronic device.

14. The method of claim 8, further comprising providing the channel of the main frame with a plurality of grooves therealong to lock at least one of: the first slide element and the second slide element to a specific position along the channel including the first configuration, the second configuration, and the alignment of both the first slide element and the second slide element along the third direction.

15. A system comprising:
a portable electronic device; and
a grip device comprising:
- a main frame configured to be attached to a surface associated with the portable electronic device via a first surface thereof, the main frame comprising a channel across a second surface thereof; and
- a flexible strap comprising a first slide element and a second slide element proximate a first end and a second end thereof respectively, the first slide element and the second slide element being receivable through the channel to movably attach the flexible strap to the main frame via the channel in accordance with sliding movement of the first slide element and the second slide element relative to one another across the channel based on a force applied to the flexible strap by a user of the portable electronic device, and, further, in accordance with the sliding movement of the first slide element and the second slide element relative to one another across the channel:

the first slide element and the second slide element are both aligned along a first direction whereby, in a first configuration of the alignment of the first slide element and the second slide element along the first direction:
  attachment of the grip device to the portable electronic device by way of the first surface of the grip device and the surface associated with the portable electronic device and insertion of a finger of the user through a first loop formed by the flexible strap render the portable electronic device usable in a portrait orientation thereof via at least one other finger of the user, the first slide element and the second slide element are both aligned along a second direction perpendicular to the first direction whereby, in a second configuration of the alignment of the first slide element and the second slide element along the second direction:
  the attachment of the grip device to the portable electronic device by way of the first surface of the grip device and the surface associated with the portable electronic device and insertion of the finger of the user through a second loop formed by the flexible strap render the portable electronic device usable in a landscape orientation thereof via the at least one other finger of the user, and alignment of both the first slide element and the second slide element along a third direction and the attachment of the grip device to the surface associated with the portable electronic device render the portable electronic device to supportable on a flat surface by a third loop by way of a portion of the third loop contacting the flat surface, wherein the channel comprises a linear first channel and a linear second channel, the linear first channel and the linear second channel intersecting perpendicularly to one another in a T-shaped configuration, and wherein the first slide element and the second slide element are both configured to be received in and slide across the linear first channel and the linear second channel.

16. The system of claim 15, wherein the main frame of the grip device is attachable to one of: a surface of the portable electronic device and a surface of a case of the portable electronic device as the surface associated with the portable electronic device.

17. The system of claim 15, wherein the third loop is one of: the first loop and the second loop.

18. The system of claim 15, wherein, based on the alignment of both the first slide element and the second slide element of the flexible strap of the grip device along the third direction and the attachment of the grip device to the surface associated with the portable electronic device, the portable electronic device is positionable on the flat surface both along a length and a width thereof.

19. The system of claim 15, wherein at least one of:
at least a portion of the main frame of the grip device is made of a magnetic material,
the main frame of the grip device is couplable to a plate made of the magnetic material such that, based on an appropriate sliding movement of the flexible strap of the grip device and a coupling of the plate to the portable electronic device, the portable electronic device is couplable to a magnetic phone stand via the plate even with the grip device still attached to the surface associated with the portable electronic device, and
the main frame of the grip device includes a notch implemented in the channel to remove the flexible strap by way of the first slide element and the second slide element therethrough without separating the grip device from the portable electronic device when the grip device is attached to the portable electronic device.

20. The system of claim 15, wherein the channel of the main frame of the grip device comprises a plurality of grooves therealong to lock at least one of: the first slide element and the second slide element of the flexible strap of the grip device to a specific position along the channel including the first configuration, the second configuration, and the alignment of both the first slide element and the second slide element along the third direction.

* * * * *